T. A. ROBINSON.
VEHICLE TIRE.
APPLICATION FILED FEB. 12, 1913.

1,071,581. Patented Aug. 26, 1913.

WITNESSES: INVENTOR.
Thomas A. Robinson
BY
ATTORNEY.

UNITED STATES PATENT OFFICE.

THOMAS A. ROBINSON, OF SALT LAKE CITY, UTAH.

VEHICLE-TIRE.

1,071,581. Specification of Letters Patent. Patented Aug. 26, 1913.

Application filed February 12, 1913. Serial No. 748,013.

*To all whom it may concern:*

Be it known that I, THOMAS A. ROBINSON, a citizen of the United States, residing at Salt Lake City, in the county of Salt Lake and State of Utah, have invented certain new and useful Improvements in Vehicle-Tires, of which the following is a specification.

My invention relates to vehicle tires, and has for its object to provide a resilient vehicle tire in which the resilient features provided therein are supplied primarily by an endless spring band and secondarily by the pneumatic inner tube.

A further object is to provide a flexible metal casing within which said spring band is held and a flexible water proof casing within which said inner tube is held, the two of said casings combining to provide a flexible shield for said inner tube.

These objects I accomplish with the device illustrated in the accompanying drawings in which similar letters of reference indicate like parts throughout the several figures, and as described in the specifications forming a part of this application and pointed out in the appended claims, it being understood that slight changes in form and character of material may be resorted to within the scope of the claims without departing from the spirit of the invention.

Figure 1:
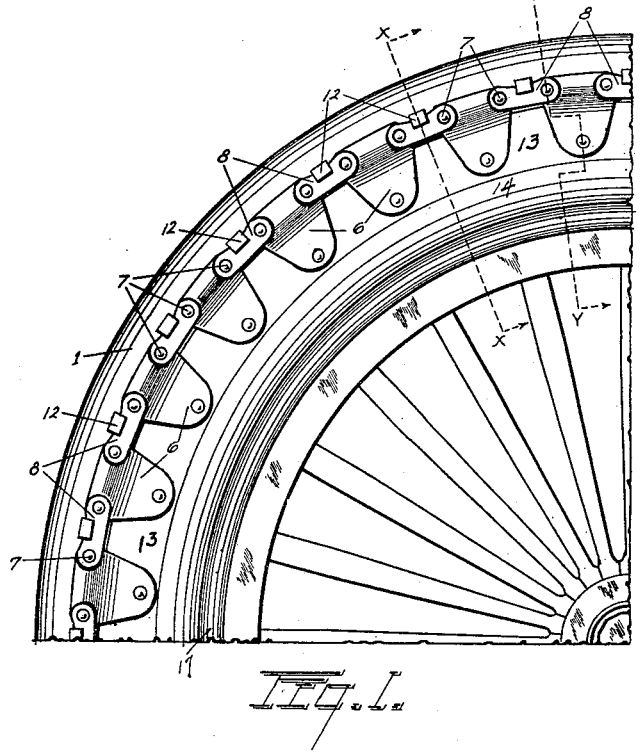
Figure 2:
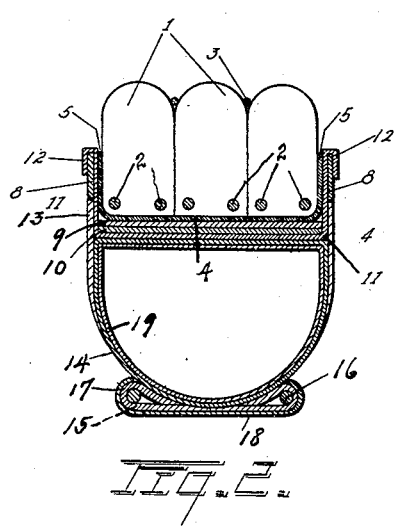
Figure 3:
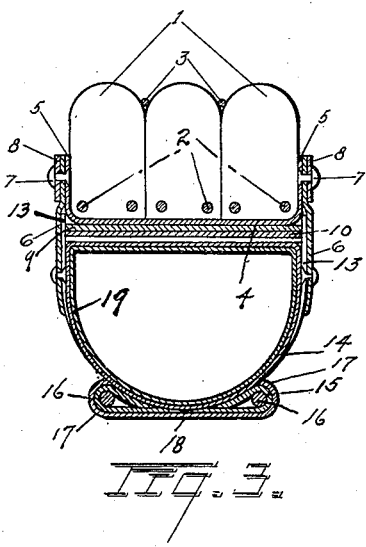
Figure 4:
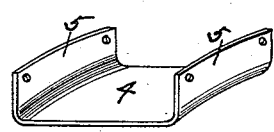

Figure 1 is a side elevation of a portion of a wheel with my tire thereon. Fig. 2 is a radial cross section through the tire on line $xx$ of Fig. 1. Fig. 3 is a similar cross section on line $yy$ of Fig. 1. Fig. 4 is a view in perspective of one of the metal bracket members forming the tread channel within which the solid tread tire is held.

In the drawings the tread tire is made preferably of rubber and in three contiguous parallel bands 1 which are secured in band form by the usual wire hoops 2 inserted longitudinally therein. Said bands 1 are held within a peripheral channel by other wire hoops 3 placed circumferentially thereon and each of said hoops 3 contacting with two of said bands. Said peripheral channel is formed by securing a plurality of bracket members 4 having the end portions 5 bent at practically right angles to the base or bottom portion, into a flexible band. Each of said bracket members 4 is pivotally secured to the adjacent bracket member by means of the guard plates 6, which are riveted thereto by the rivets 7. To give additional strength to said band a link 8 is also fastened by said rivets 7 across the intervening space between each two of said guard plates and parallel with the portions 5 of said bracket members. A flexible band of fiber 9 or asbestos and wire woven together to form a band and called rabestos is held against the inner periphery of said channel by means of a spring metal band 10 which is inserted within said flexible fiber band and closely contacts with the inner periphery thereof. U-shaped stays 11 are transversely fitted within said metal band with their end portions 12 outwardly bent and radially inserted between said links 8 and the portion 5 of said bracket members 4. Said end portions 12 are then bent outwardly and downwardly to engage said links 8. Said stays are provided to prevent a short inward bend or buckling of said metal spring band 10 and to lock the said metal spring band, the fiber band and said channel band together and also to prevent the creeping of either of said bands. Annular straps 13 made of water proof flexible material are riveted to the inner side of said guard plates with their peripheries adjacent the inner sides of said links 8 and the inner edges attached to a flexible water proof tubular casing 14 one on each side thereof. On each side of said casing 14 and concentrically within said annular straps a reinforcing strap 15 is secured which incloses a hoop 16, in order to build up and form an engaging lug and secure the same to said tubular casing 14. Said lugs are to be engaged by the outwardly extended flanges 17 integrally formed on the edges of an inner metallic band 18. Within said tubular casing 14 is provided the pneumatic inner tube 19 similar in construction and use to the ordinary inner tube of the pneumatic type of wheels within which compressed air is used as an inflating element. My tire may be used and fastened on any wheel of the usual clincher type and for that purpose is made in different sizes.

Having thus described my invention I desire to secure by Letters Patent and claim:

1. In a device of the class described, the combination of a plurality of bracket shaped members; guard plates riveted thereto to form an annular band; links parallel to said bracket shaped members and connecting said guard plate; a cushion band seated within said annular band; an endless spring concentrically within said annular band; transverse stays engaging said links and passing under said spring band; annular, flexible, water-proof straps secured to said guard plate; a tubular water-proof casing attached to the inner edge of said annular straps and with its outer periphery bearing against said metal spring band and stays; annular engaging lugs secured to said water-proof casing; and a metal band having outwardly extended flanges adapted to engage said lugs.

2. In a device of the class described the combination of a plurality of bracket shaped members each having outwardly extended end portions; guard plates riveted to said end portions to form an annular band; a tread member in said channel; links parallel to said bracket shaped members and connecting said guard plates; a fiber band seated within said annular band; an endless spring seated within said fiber band; transverse stays engaging said links and passing under said spring band; annular flexible water-proof straps secured to said guard plates; a tubular water-proof casing attached to the inner edge of said annular straps and with its outer periphery bearing against said metal band and stays; annular engaging lugs secured to said water-proof casing; and a metal band having outwardly extended flanges adapted to engage said lugs.

In testimony whereof I have affixed my signature in presence of two witnesses.

THOMAS A. ROBINSON.

Witnesses:
  SAM RANEY,
  R. B. McINTOSH.

---

Copies of this patent may be obtained for five cents each, by addressing the "Commissioner of Patents, Washington, D. C."